March 24, 1959     E. G. THEM     2,879,357
THERMOSTATIC CONTROLS

Filed Dec. 30, 1957     2 Sheets-Sheet 1

INVENTOR.
EDWARD G. THEM
BY
ATTORNEY

March 24, 1959    E. G. THEM    2,879,357
THERMOSTATIC CONTROLS

Filed Dec. 30, 1957    2 Sheets-Sheet 2

INVENTOR.
EDWARD G. THEM
BY
ATTORNEY

United States Patent Office 2,879,357
Patented Mar. 24, 1959

2,879,357

THERMOSTATIC CONTROLS

Edward G. Them, Mansfield, Ohio, assignor to Therm-O-Disc, Incorporated, Mansfield, Ohio, a corporation of Ohio Application December 30, 1957, Serial No. 706,100

5 Claims. (Cl. 200—138)

This invention relates to thermostatic control devices for electrical circuits, the specific embodiment of which shown in the accompanying drawings being designed especially for controlling the circuit of an electric fan impelling a current of air in a conduit, as in the air circulating system of a household furnace, the fan being required to operate only when the air current is at a temperature between two predetermined limits.

The desired accuracy of control involves two related problems, one being the providing of structure adopted for holding the thermal responsive element at a position well within the interior part of the air current and so exposed thereto as to be quickly responsive to changes of the temperature that is a measure of the effective temperature of the air current as a whole. The other is the problem of providing quick and definite make and break of the electric circuit of the fan without excessive arcing or "creeping" of the contacts in spite of the remoteness of the thermal responsive element, and corresponding length of connections, when the contacts of the control are external to the air conduit and the thermal element is positioned within the conduit. The invention is not wholly limited however, to structure providing the solution to both of these related problems.

It is among the objects of the present invention to provide a new and novel thermostatically controlled switch for use in connection with furnace fans which overcomes the drawbacks and undesirable features of prior devices as is indicated by the foregoing statement of the problems.

A further object of the present invention is to provide a new and novel thermostatically controlled switch for use in connection with the air conduit of a household furnace which is of simple construction, uniform and positive in operation within a predetermined temperature range and economical to manufacture.

These and other objects and advantageous features of the invention, not at this time more particularly pointed out, will become more apparent as the nature of the invention is better understood from the following detailed description taken in conjunction with the accompanying drawings, wherein like reference characters denote corresponding parts, and wherein.

Figure 1:
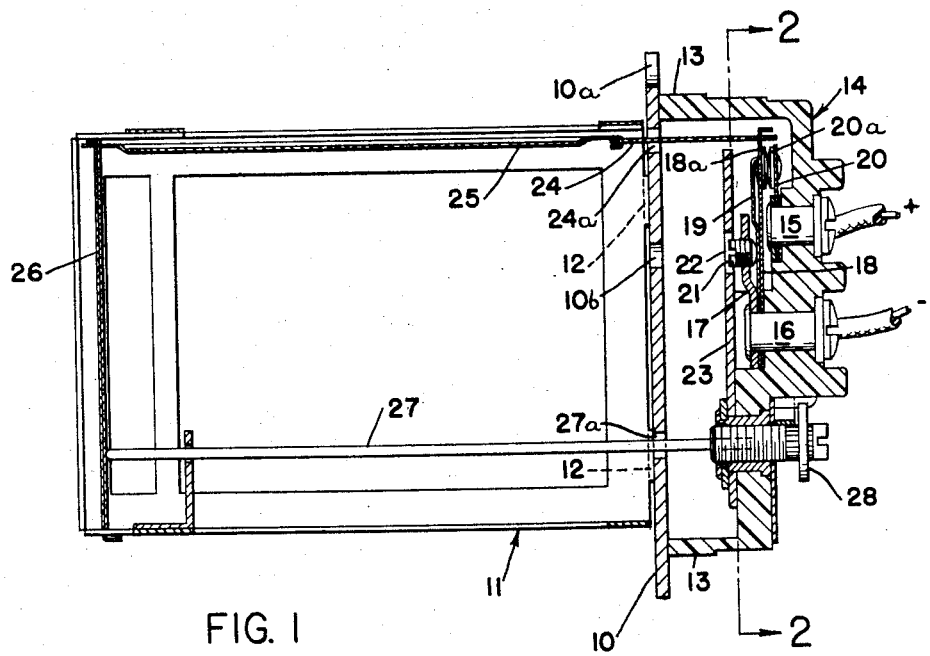
Figure 1 is a vertical medial sectional view of a thermostatic control device embodying my invention in its preferred form and adapted to be mounted upon the outer wall of the air conduit with parts thereof extending into the conduit through an aperture in the wall of the conduit, taken on line 1—1 of Figure 3.
Figure 2:
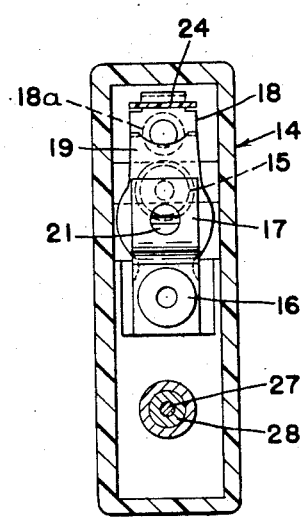
Figure 2 is a sectional view taken on line 2—2 of Figure 1.
Figure 3:
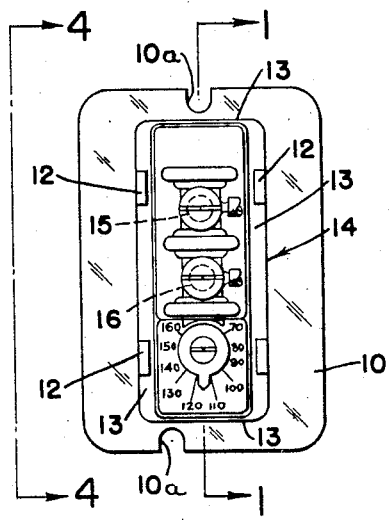
Figure 3 is a front elevational view of the device illustrated in Figure 1.
Figure 4:
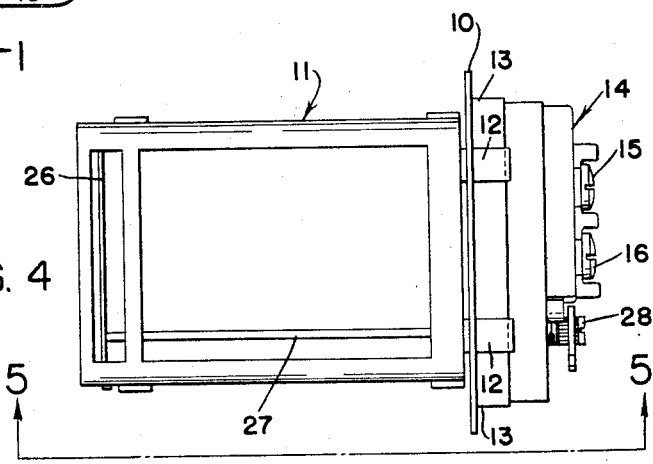
Figure 4 is a side elevational view of the device of Figure 1, taken on line 4—4 of Figure 3.
Figure 5:
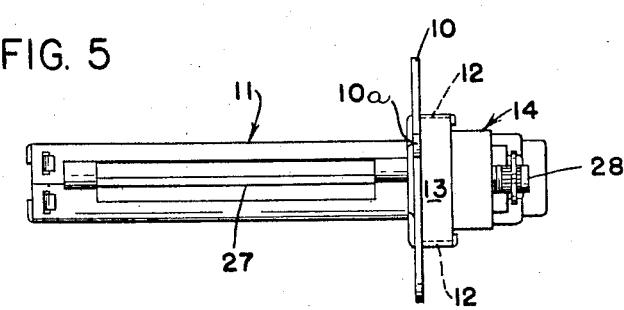
Figure 5 is a bottom view of the device, taken on line 5—5 of Figure 4.

With reference to the accompanying drawings there is illustrated a thermostatically controlled device embodying a switch mechanism for controlling the circuit of a furnace air fan made in accordance with the present invention and including a base plate 10 formed with marginal notches such as the notch 10a for securing the same to the outer wall of the conduit as a cover for an aperture therein. Secured to the inner face of the plate 10 is a substantially rectangular open-work frame 11, preferably of die-cut, bent and spot-welded sheet metal, arranged to project into the conduit through the opening in the latter's wall, as by bent tabs 12, 12 of the sheet metal extending through complemented openings in the base plate and having thin end portions, on the outer side of the base plate, in gripping relation to base flanges 13, 13 formed on a molded dielectric contactor housing 14. A bi-metallic element 26 is supported in the frame 11 adjacent to and substantially parallel to the end thereof remote from the plate 10. One end of the bi-metallic element 26 is anchored or otherwise secured in the frame and the other end is free to move in response to temperature changes of the air current within the conduit.

The internal face of the front wall of the housing is of stepped form as shown clearly in Figure 1 for horizontal offset of the inner end of a short upper terminal post 15 and a longer lower terminal post 16 mounted in the said front wall. Clamped on the inner end of the lower post 16 by an adjusting-screw bracket 17, are a spring contact arm 18 and, as a backing for it, an element 19 of the dished snap type having an over-center spring action. For mating with the contact button 18a on the spring contact arm 18, a contact button 20a is mounted upon the upper free end of a spring metal contact arm 20 which is clamped upon and projects upward from the inner end portion of the upper terminal post 15. Contactor arms 18 and 20 are preferably made of a beryllium-copper alloy for good and lasting spring characteristics.

An adjustment screw 21 threaded through the bracket 17, is accessible for adjustment through an opening 22 in a flash plate 23 and an opening 10b in the base plate 10, and bears against the snap element 19. By means of the screw 21 the snap element is adjusted to a position such that when it is in its position of stability it holds the spring contactor arm 20 in a slightly bent or biased position, through the mating pressure of the contactor buttons. However, the button 20a being supported on a shorter arm has to move as compared with the button 18a upon a contemplated change of temperature of the thermal element, including the part of the disengagement movement of the button 18a that is made easy by the disengaging snap action of the snap-element 19, beyond its critical snap-over position.

The snap element of the present embodiment is of the type in which after the disengaging snap-over, the element continues to be biased, but lightly toward contact position, but the invention is not wholly limited to a snap element of that type. As the thermal element pulls the contact button 18a to the left in Figure 1, recoil of the bent spring contact arm 20 causes the contactor button 20a to follow along in contact with the button 18a, preferably until, with proper adjustment, the snap-element is exactly at, or slightly beyond its critical snap-over position. Thus, even though the change of temperature of the thermal element is very slow, good contact of the buttons is maintained at least until the very instant of the snap action, and arcing and rhythmic making and breaking of the contacts is avoided.

The resiliency of the contact arm 20 lessens the necessary delicacy of adjustment of the screw 21 because it is necessary only that the button 20a stop its follow-along movement at some position of the button 18a within an appreciable range beginning at and extending slightly beyond the snap position. Stating the matter another way, the adjustment can easily be made such that the breaking will occur entirely in the second state of the snap action in all of which stage the button 18a has strong and rapid movement because of the reduced strength of the bias resulting from the snap action as distinguished from slow movement to snap position effected by spring force slowly developed in a thermal responsive element for pulling a movable button away from a stationary button, with the break necessarily beginning either exactly at or before the critical position has been reached by the snap element.

In the remaking of the contact in the present embodiment the contact button 20a remains at the position determined by the non-strain position of its contact arm 20 and the recontact is made immediately after the bi-metallic element has eased the snap element to its critical snap position and the closing of the contacts is effected wtih a positive snap action.

The tolerance of adjustment permitted by the resiliency of the contact arm 20 permits the use of long connecting means comprising the fiber-glass insulating strip 24, freely exending through an opening 24a in the base plate 10 and the metal tension strip 25, said connecting means extending from the snap element 19 to the freely movable end of bi-metallic element 26. The use of such a long connection is permitted in spite of substantial heat-expansion of the long metal strip 25 offsetting in part, or augmenting (according to whether the element 26 is set to pull in response to rise or in response to fall of temperature) the effect of the circuit-breaking temperature-deformation of the bi-metallic element.

Similarly the tolerance of adjustment permits the use of a long push rod 27, extending freely through an opening 27a in the base plate 10 for the thermostatic setting device 28. Thus the frame or cage 11 of open-work form for good bathing of the bi-metallic element 26 by the air current in the conduit can be of long length as shown, for the purpose above indicated. The invention, however, is not wholly limited to the long frame-length feature. It is believed that the mode of operation has been fully and clearly brought out in the foregoing description. The invention has the advantages that are set out in the above statement of objects.

Having thus described my invention so that those persons skilled in the art may understand and practice the same, what I desire to obtain by Letters Patent is embodied in the appended claims.

I claim:

1. A thermostatic control device comprising a base plate formed for attachment to the outer face of a fluid conducting conduit as a covering for an opening in the wall thereof, an open-work frame secured to the inner face of said plate and adapted to extend through the said opening with its outer end positioned within the conduit, a flat bi-metallic element mounted upon said frame at a position remote from said plate, said bi-metallic element having one end anchored in said frame and the other end arranged to deflect upon change in temperature within said conduit, a contactor housing mounted upon the outer face of said plate, a pair of make-and-break flexible current carrying members having engaging contacts thereon mounted in said housing, means extending through an opening in said base plate for operatively connecting one of said current carrying members with the free end of the bi-metallic element, and over-center means juxtapositioned with respect to the said last mentioned current carrying member for modifying the action of the bi-metallic element upon said last mentioned contact element.

2. A thermostatic control device comprising a housing, a pair of current carrying members supporting make-and-break contact elements within said housing, means for supporting said contacts in make-and-break relation with respect to each other, a flat bi-metallic element extending parallel to and spaced remote from said current carrying members and operatively connected with one of said current carrying members for effecting movement thereof, and a snap element continuously bearing against said last mentioned current carrying member for modifying the action of the bi-metallic element thereupon, said second current carrying member being resiliently yielding for back-and-forth movement thereof in response to variations of pressure of the mating contact element against it.

3. A thermostatic control device comprising a base plate formed for attachment to the outer surface of a fluid conducting conduit as a covering for an opening in the wall thereof, an open-work frame secured to the inner face of said plate and adapted to extend through the said opening and having its outer end positioned in said conduit, a thermal responsive element mounted on said frame parallel to and at a position remote from said plate, a contactor housing mounted upon the outer face of said plate, a pair of current carrying members supporting make-and-break contact elements mounted in said housing means extending through an opening in said base plate for operatively connecting one end of said thermal responsive element to one of said current carrying members, and a disked snap element for modifying the action of the heat responsive element upon that one of said current carrying elements, said snap element arranged to slidably engage and bear against the outer free end of said last mentioned current carrying member, the other one of said current carrying elements being a resiliently yielding element for back and forth movement thereof, in response to variations of pressure of the mating contact element against it.

4. A thermostatic control device comprising a base plate formed for attachment to the outer surface of a fluid conducting conduit as a covering for an opening in the wall thereof, a housing mounted on the outer face of said plate, a pair of current carrying members having mating contact elements operatively mounted within said housing, a substantially rectangular open-work frame mounted on the inner face of said frame and arranged to have its outer end project into said conduit, a bi-metallic element mounted in the outer end of said frame at a position remote from said plate, said bi-metallic element extending substantially parallel with said plate and having one end anchored and the other end free to move in response to temperature changes, means for operatively connecting one end of said bi-metallic element to one of said current carrying members for moving the same relative to the other of said current carrying members, and means juxtapositioned to and freely movable with said first mentioned current carrying member for effecting a snap action to the making and breaking of said contact elements.

5. A thermostatic control device comprising a base plate formed for attachment to the outer surface of a fluid conducting conduit as a covering for an opening in the wall thereof, a housing mounted on the outer face of said plate, an electric switch including a pair of flexible current carrying members mounted within said housing, a substantially rectangular frame mounted on the inner face of said frame and arranged to project into said conduit, a bi-metallic element supported in said frame adjacent the side thereof remote from said plate in parallel relation thereto, said bi-metallic element having one end secured in said frame and the other end freely movable in response to temperature changes, means connecting said free end of said bi-metallic element to one of the current carrying members of said switch for actuating the same, and means operable upon said current carrying member to effect a snap action when moved by said bi-metallic element.

References Cited in the file of this patent

UNITED STATES PATENTS

| 2,774,847 | Ray et al. | Dec. 18, 1956 |
| 2,776,797 | Suesserott | Jan. 8, 1957 |
| 2,823,283 | Malone | Feb. 11, 1958 |